United States Patent Office 3,817,884
Patented June 18, 1974

3,817,884
OZONE RESISTANT COMPOSITIONS
John B. Campbell, Hockessin, and Robert Dean Thurn, Wilmington, Del., assignors to E. I. du Pont de Nemours and Company, Wilmington, Del.
No Drawing. Application May 19, 1970, Ser. No. 38,862, which is a continuation-in-part of application Ser. No. 625,598, Mar. 24, 1967, both now abandoned. Divided and this application Apr. 17, 1972, Ser. No. 244,886
Int. Cl. C08d 9/04
U.S. Cl. 260—5
12 Claims

---

The incorporation of units derived from a $C_5$ to $C_{110}$ polyolefin having two polymerizable double bonds said units being present in an amount resulting from the addition to the reaction mixture from which the copolymer is formed of from 0.01 to 0.5 gram-moles/kg. of copolymer formed of said $C_5$–$C_{110}$ polyolefin or in EPDM elastomer produces chain branching, with a consequent improvement in properties such as cold-flow of the uncured stock, and improved ozone resistance of natural rubber or synthetic diene blends.

---

CROSS-REFERENCE TO RELATED APPLICATIONS

This is a Division of application Ser. No. 38,862, filed May 19, 1970 which, in turn, is a continuation-in-part of application Ser. No. 625,598 filed Mar. 24, 1967 both now abandoned.

BACKGROUND OF THE INVENTION

This invention relates to sulfur-vulcanizable, chain-saturated elastomeric, α-olefin copolymers having improved cold-flow. More particularly this invention relates to improving the ozone resistance of blends of chain-unsaturated diene polymers with sulfur vulcanizable, chain-saturated, elastomeric α-olefin copolymers by the introduction of a controlled amount of chain branching into the α-olefin copolymer.

Among the polymers of the aliphatic olefins that are made by use of coordination complex compounds of the transition metals as polymerization initiators, the amorphous copolymers of ethylene with higher alpha-monoolefins constitue an important class because of their desirable elastomeric character and their generally excellent resistance to ozone and other chemicals. The chemical inertness of these polymers is attributed to the fact that the linear chain or "backbone" is a completely saturated structure without the reactive double bonds of the common elastomeric materials such as natural rubber or the synthetic elastomers made from conjugated diolefins. This chemical inertness made the early polyolefin elastomers, namely amorphous ethylene-propylene copolymers, impossible to vulcanize with the sulfur systems preferred in the rubber industry. This problem was solved by incorporating as third monomers, non-conjugated diolefins containing both a readily polymerizable and a relatively non-polymerizable double bond, thus forming an elastomeric polymer consisting of a linear saturated backbone having pendant unsaturated hydrocarbon groups capable of participating in crosslinking reactions with sulfur curing systems. The use of non-conjugated aliphatic diolefins such as 1,4-hexadiene and 6-methyl-1,5-heptadiene as the third monomer in hydrocarbon elastomers of this sort is taught, for instance, in U.S. Pat. 2,933,480, and the use of bridged ring diolefins having double bonds of unequal reactivity is similarly taught in U.S. Pat. 3,211,709.

It is the nature of coordination complex polymerization of olefin hydrocarbons to form practically linear, unbranched polymer chains. While a strictly linear polymer structure is advantageous in the stiff, crystalline polyolefins used as thermoplastic molding materials, such as polyethylene and polypropylene, it is not necessarily so in amorphous polyolefins that are used as elastomers. As a matter of fact, it has been found that strictly linear polyolefin elastomers show relatively undesirable cold-flow properties unless the polymer has an especially broad distribution of molecular weights. For example, the undesirable cold-flow properties cause the elastomer to rupture bags in which they are packaged during storage. However, such a distribution of molecular weight causes undesirably high viscosity of dilute solutions of the polymer in the solvents employed in their manufacture and use.

DESCRIPTION OF THE INVENTION

The present invention provides sulfur curable chain-saturated branched elastomers comprising amorphous copolymers consisting essentially of (a) from 25 to 75% by weight of ethylene units,
(b) units derived from a $C_5$ to $C_{110}$ polyolefin containing two polymerizable double bonds, said polyolefin units being present in an amount resulting from the addition to the reaction mixture from which said copolymer is formed of about from 0.01 to 0.5 gram mole per kilogram of copolymer formed of said $C_5$–$C_{110}$ polyolefin, not to exceed 15% by weight of the copolymer, and
(c) sufficient units of a nonconjugated diolefin containing only one polymerizable double bond to provide 0.1 to 4.0 gram mole/kilogram of polymer of carbon-carbon double bonds derived from the diolefin containing one readily polymerizable double bond; and
(d) the remainder of said polymers being propylene units, said polymers being prepared by an organo-soluble coordination catalyst.

The present invention also provides a sulfur curable ozone resistant composition consisting essentially of about 10 to 30 parts by weight of the copolymer of this invention and about 90 to 70 parts by weight of a polyunsaturated elastomer.

As used herein, the term "consisting essentially of" has its generally accepted meaning as requiring that specified components be present, but not excluding unspecified components which do not materially detract from the basic and novel characteristics of the composition as disclosed.

Methods for carrying out the polymerization of olefin hydrocarbons with coordination complex catalysts are well known in the art. See, for instance, "Linear and Stereo-regular Addition Polymers," by Gaylord and Mark, Interscience Publishers, New York, 1959. Among the most useful catalyst systems for making elastomeric copolyolefins are those based on soluble compounds of vanadium such as vanadium oxytrichloride, vanadium tetrachloride, vanadium tris-(acetylacetonate), etc., used in conjuction with organoaluminum compounds such as aluminum alkyls (e.g., triisobutyl aluminum), and alkyl aluminum halides (e.g., diisobutyl aluminum chloride), and so on. It is preferable that a halogen be present on at least one of the catalyst components. Many variations and refinements of these catalyst systems are now well known in the art. The particular organo-soluble catalyst system used is not critical to the practice of this invention as long as it is capable of forming practically amorphous copolymers of olefin hydrocarbons.

A variety of solvents can be employed with the catalyst. Among the most useful are tetrachloroethylene, and aliphatic hydrocarbons such as hexane. Other solvents will be apparent to those skilled in the art.

Methods for copolymerizing ethylene and propylene to form amorphous polymers that have the basic characteristics of a synthetic rubber are well known in the art. The principle of making such polymers vulcanizable with sulfur curing systems by introducing as a third polymerizable monomer a multiolefin having only one polymerizable double bond is also known. Polymerizable double bond is also known. Polymerizable double bonds in coordination polymerization systems are generally found to be unhindered terminal double bonds in aliphatic olefins, or double bonds in strained ring cycloaliphatic compounds, such as cycloaliphatic compounds having one- or two-carbon bridged ring structures. Double bonds that are found not to be readily polymerizable are generally the internal, i.e., nonterminal double bonds of aliphatic olefins, sterically hindered double bonds of aliphatic olefins such as those carrying a methyl group or other substituent on one of the doubly bonded carbon atoms, and double bonds in relatively unstrained cycloaliphatic rings. Typical non-conjugated diolefins containing only one polymerizable double bond that are suitable in copolymers of this invention are 1,4-hexadiene, 2-methyl-1,5-hexadiene, 1,9-octadecadiene, 6-methyl-1,5-heptadiene, 7-methyl-1,6-octadiene, 11-ethyl-1,11-tridecadiene, and the like. Typical cycloaliphatic compounds that can serve the same purpose include dicyclopentadiene, tricyclopentadiene, 5-ethylidene-2-norbornene, 5-methylene-2-norbornene, alkenyl substituted norbornenes having an internal double bond in the alkenyl group (e.g., 5-(2'-butenyl)-2-norbornene), unsaturated derivatives of bicyclo (2,2,2)-octane, and so on. The use of such compounds to provide pendant sulfur-reactive unsaturated structures on an amorphous polyolefin is well known in the art.

Amorphous copolyolefins including ethylene, propylene, and one or more of the above-mentioned diolefins made by the prior art methods are mainly straight-chain polymers and have the disadvantages already mentioned.

A desirable ramification, i.e. chain branching, can be introduced into polymers of the general class by including a carefully selected proportion of a fourth monomer that has two polymerizable double bonds. As used herein, the term "polymerizable double bond" is meant terminal, unhindered double bonds in the main chain structure of the monomer, and the double bonds in strained ring cycloaliphatic structures. Suitable monomers may contain two terminal double bonds, two strained ring double bonds, or one of each.

The monomers generally suitable for incorporation as the fourth monomer are $C_5$ to $C_{110}$ polyolefins. The amount of the polyolefin is not to exceed 15% by weight of the copolymer. Incorporation of larger amounts of polyolefin produces a copolymer which yields an impractical curing formulation. For example, whereas 2 to 4 parts of sulfur are generally required to cure an EPDM elastomer, 8 to 10 parts of sulfur may be required when the polyolefin in the copolymer of this invention exceeds 15 weight percent.

Typical monomers suitable for this purpose are 1,4-pentadiene, 1,5-hexadiene, 1,7-octadiene, 1,9-decadiene, 1,20-heneicosadiene, 5-(5-hexenyl)-2-norbornene, 5-(2-propenyl)-2-norbornene, and the like. A particularly suitable diolefin having two strained ring double bonds is the reaction product of norbornadiene-2,5 and cyclopentadiene having the following structure

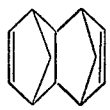

For simplicity, this compound will be called "norborneo norbornene," although its systematic name is 1,4,4a,5,8,8a-hexahydro - 1,4,5,8 - dimethano-naphthalene. Compounds similar but resulting from the addition of more bridged ring units by further condensation with cyclopentadiene can also be used, such as

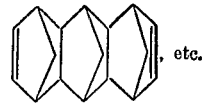, etc.

2,5-norbornadiene can be used, and the dimer thereof, which can be represented by the formula

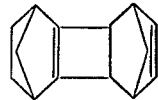

is especially useful.

Other monomers suitable for incorporation as the fourth component are aliphatic and aromatic compounds having two terminal allyl groups. The allylic radical is represented by the formula $$CH_2\!=\!CH\!-\!CH_2\!-$$

with each radical furnishing one polymerizable double bond when terminally located. Particularly suitable are compounds of the following formula:

$$CH_2\!=\!CH\!-\!CH_2\!-\!(R)\!-\!CH_2\!-\!CH\!=\!CH_2$$

where R is $(CH_2)_x$ with $x = 0-29$, or phenylene, alkyl substituted phenylenes, naphthalene, polybutadiene, polyisoprene, polystyrene, poly-$\alpha$-methylstyrene, butadiene-styrene copolymer, butadiene-isoprene copolymer, isoprene-styrene copolymer, or polyvinylnaphthalenes.

When esters, ethers, or any monomer containing a hetero-atom, such as oxygen, sulfur or nitrogen, are present during polymerization, it is preferable to complex the hetero atom to facilitate polymerization. This is conveniently accomplished by using an excess amount of organoaluminum compound in the coordination catalyst system as will be apparent to those skilled in the art.

Analysis of the amount of monomer having two polymerizable double bonds incorporated in the polymer has in some cases proved difficult. The proportions described herein and in the following examples are the proportions employed in the synthesis. During the synthesis, it is preferred that the conversion of the diolefin containing only one polymerizable double bond be at least 20 percent. Also, it is preferred that the conversion of the polyolefin containing two polymerizable double bonds be at least 20 percent; as conversion is increased, a smaller amount of the polyolefin is required to obtain the desired branching.

In the case of linear diolefins containing two terminal allyl groups the efficiency of the diterminal olefin as a modifying agent appears to increase with chain length to about 8 carbon atoms. Diterminal olefins having 8 or more carbon atoms are most efficient. It is accordingly preferred to employ $\alpha$-$\omega$-diolefins containing from 8 to 35 carbon atoms as the modifying agent.

The branched copolymers of the present invention consist essentially of linear chains or "backbones" with branching along the chains. These branched copolymers differ from previously known EPDM copolymers having a practically linear structure. Chain branching is demonstrated by the fact that the copolymers of this invention have physical properties substantially different than those of practically linear copolymers, such as known EPDM copolymers. The properties of the copolymer used to detect branching are the solution (inherent) viscosity and bulk viscosity as indicated by the Wallace plasticity. For example, the inherent viscosity and Wallace plasticity of a practically linear copolymer and a branched copolymer are measured as described in the following examples. The results are compared, and the branched copolymer shows a greater rate of change in Wallace plasticity than the rate of change in inherent viscosity. Thus, for a given inherent viscosity, the Wallace plasticity is greater for the branched than for the unbranched copolymer.

Mooney viscosity is measured at 121° C. in accordance with ASTM Method D–1646–67 using the large rotor. After the sample has been warmed in the machine for one minute, the shearing disc viscometer motor is started to begin the test. Four minutes later the reported viscosity reading is taken.

Wallace plasticity is a measure of the amount of flow or deformation of unvulcanized elastomeric materials under load. The sample to be tested is sheeted and cut into pellets having a thickness in the range 3.18–6.35 mm. (0.125–0.300 inch). The test is performed with a Wallace plastimeter manufactured by H. W. Wallace and Co., Ltd., London. During a 10-second period the pellet is simultaneously compressed to exactly 1.0 mm. in thickness and heated to 100° C., the resulting test piece is then subjected to a 10 kg. load for exactly 15 seconds at 100° C. The final thickness of the test piece, expressed in units of 0.01 mm., is the plasticity value reported. The standard 1-cm. diameter platen is suitable for pellets of average hardness. Proper platen temperature regulation is most important because elastomer plasticity is usually temperature dependent. Plasticity readings should normally fall between 20 and 90 on the scale for most reliable readings.

The elastomeric products of the present invention can be processed with conventional rubber processing equipment in the same way as other sulfur curable $\alpha$-olefin based elastomers, particularly those elastomers having a broad molecular weight distribution.

Conventional compounding ingredients such as carbon black, mineral fillers, coloring agents, extending oils and the like are generally incorporated into the polymers.

Various curing systems can be employed, as will be apparent to those skilled in the art. The most important of these curing systems is the sulfur curing system which is applicable to all of the polymers within the scope of this invention. Other curing systems include quinoid curing systems, phenolic curing systems and peroxide curing systems.

The polymers of the present invention have improved cold flow resistance when isolated, compared with elastomers having the same proportions of ingredients and made with the same catalyst but omitting the modifying amount of diolefin containing two polymerizable double bonds. The above improvement is indicated by the increased Wallace Plasticity. As shown in the examples, the Wallace Plasticity of the Products can be substantially increased without any substantial increase in solution viscosity.

This invention is further illustrated by the following specific examples. All parts, proportions, and percentages are by weight unless otherwise indicated.

EXAMPLE 1

Production of Ethylene/Propylene/1,4-Hexadiene/1,7-Octadiene Copolymer

The following general procedure is used. A one-liter resin flask is equipped with a stirrer, thermometer, a gas inlet tube, a rubber (serum) cap and gas outlet tube. The resin flask stirrer, gas inlet tube and gas outlet tube are dried in an oven at 65° C. and 105 mm. pressure for at least thirty minutes before use. One-half liter of heptane which has been dried over silica gel and sparged with nitrogen is introduced into the resin flask along with 3.4 ml. of 1,4-hexadiene. The rapidly stirred solvent is then presaturated with ethylene and propylene at flow rates of 1 and 2 liters/min., respectively, the feed stream being introduced below the surface of the solvent. The flow of gases to the resin flask is then left unchanged throughout the subsequent polymerization. The ethylene and propylene are metered through separate rotameters at a back pressure of 3 p.s.i. and combined at a three-way joint before being introduced into the resin flask. The ethylene and propylene are dried individually by passage through a two-foot high column of Molecular Sieve Type 5A. After the solvent has been presaturated, a polymerization is initated by introducing 5 ml. of a 1.0 Molar solution of diisobutylaluminum chloride in tetrachloroethylene and 5 ml. of a 0.1 Molar solution of vanadium trisacetylacetonate in benzene by means of hypodermic syringes. The flask contents are kept at 25° C. by external cooling with Dry-Ice-acetone bath for a period of thirty minutes, after which time 10 ml. of a 1% solution of 4,4'-thio bis(6-$t$-butyl-$m$-cresol) in isopropyl alcohol is added to stop the polymerization.

1,7-Octadiene, a diolefin having two readily polymerizable double bonds, is added at a constant rate throughout the thirty-minute reaction period. The octadiene is conveniently handled in the following way: A small quantity of 1,8-octadiene, shown to be 97% pure by vapor phase chormatography, is passed through a short column of alumina, the effluent collected under nitrogen and the desired amount is accurately weighed into a volumetric flask where it is diluted with 200 ml. heptane and stored under nitrogen. A control is prepared with no 1,7-octadiene.

After the reaction has stopped, the feed streams are shut off, and the polymer solution is washed with 200 ml. of 5% hydrochloric acid until the organic phase is colorless. The organic layer is separated and washed twice more with 200 ml. proportions of water. The solvent is allow to evaporate from the polymer solution in a porcelain pan. The copolymer produced is obtained as a thin film which is dried at 60° C./105 mm. for 24–36 hrs. The reaction is repeated three more times with varying quantities of 1,7-octadiene. The results are described in Table I.

Propylene content is determined from the infrared absorption spectrum, and 1,4-hexadiene content is determined from the infrared absorption spectrum or by bromine absorption. Inherent viscosity is determined on a 0.1% solution of the polymer in tetrachloroethylene at 30° C. The amount of insoluble polymer found is determined by heating one gram of sample one day at 80° C. in 100 ml. of tetrachloroethylene with no agitation. The resulting solution is filtered through a tared 200 mesh screen. The screen is dried and weighed. The substantial increase in bulk viscosity of the polymer that is achieved by incorporating 1,7-octadiene, with only minor change in solution (inherent) viscosity, is shown by the Wallace Plasticity values for the resulting polymers.

TABLE I.—E/P/1,4-HD/1,7-OCTADIENE COPOLYMERS

| Example 1 | Yield, grams | Wt. percent Propylene | Wt. percent 1,4-hexadiene | Wallace plasticity | $\eta_{inh.}$ | 1,7-octadiene, moles/kg. polymer | Percent insolubles |
|---|---|---|---|---|---|---|---|
| A | 19 | 49 | 2.8 | 42 | 2.14 | .067 | 0.3 |
| B | 19 | 49 | 4.3 | 22 | 1.81 | .034 | 0.5 |
| C | 20.7 | 51 | 2.7 | 19 | 1.79 | .016 | 0.4 |
| Control | 19 | 49 | 3.2 | 19 | 1.79 | a 0 | 0.2 | a Control.

EXAMPLES 2-5

Production of Ethylene/Propylene/Hexadiene Copolymer With Various Dienes Having Two Readily Polymerizable Double Bonds Incorporated Therein In a reactor as in Example 1 is placed 500 ml. of tetrachloroethylene which has been dried over silica gel and sparged with nitrogen, and 3.8 ml. of 1,4-hexadiene. A combined stream of nitrogen, ethylene, and propylene is introduced at flow rates of 0.5, 1, and 2 liters/minute, respectively. Reaction temperature is 0° C. Diene with two readily polymerizable double bonds is then added as indicated in Table II, and polymerization is initiated with 5 ml. of a 1.0 Molar solution of diisobutylaluminum chloride and 5 ml. of 0.1 Molar vanadium compound as shown in Table II. The reaction is allowed to proceed for 15-20 minutes, and the polymer is isolated as in Example 1.

Table II shows the desirable effects on plasticity and cold flow properties of several dienes having two readily polymerizable double bonds. 1,4-Pentadiene and 1,7-octadiene are readily available diolefins of this class. 1,20-Heneicosadiene is prepared from heneicosa-1,20-dien-11-one by Wolf-Kishner reduction, the ketone having been made from 11-undecenoyl chloride by the method of Sauer, J. Am. Chem. Soc., 69, 2444 (1947). The 5-(5-hexenyl) norbornene is prepared by the method of U.S. Pat. 3,144,491. Vanadium components of the catalysts are vanadium trisacetylacetonate, V(AA)$_3$, and vanadium oxytrichloride, VOCl$_3$.

The greatly increased bulk viscosity of the polymers with increasing incorporation of dienes with two readily polymerizable bonds, even though solution viscosity is little affected, is shown both by the Wallace Plasticity data and by the Cold Flow data.

Cold flow is measured at 100-102° C. in the following manner. A device is assembled such that weighed brass cylinders (124-125 g., 19.5 mm. in diameter) freely sliding through holes in a one-inch iron plate will exert a pressure of 0.6 p.s.i. on a molded cylindrical pellet of the polymer resting on another iron plate. The height of the pellet is measured before and after a period of heating in an oven and the results reported as percent compression set, i.e., (change in height/original height) × 100. The pellets are ¾ in. in diameter and ½ in. in height, as called for by ASTM D945-59.

EXAMPLE 6

Production of Ethylene/Propylene/5-Methylene-Norbornene/1,7-Octadiene Copolymer In a reactor as in the previous Examples, using the procedure described in Examples 2-5, except at a reaction temperature of 25° C., an ethylene, propylene, 5-methylene-norbornene terpolymer is prepared. The 5-methylene-norbornene is added in the following way: Two ml. of a solution consisting of 5.0 gm. of 5-methylene-2-norbornene in 110 ml. of tetrachloroethylene is added to the solvent before the catalyst and co-catalyst are added. The diisobutylaluminum chloride and vanadium trisacetylacetonate solutions are injected, and the polymerization is allowed to proceed for fifteen minutes during which time 18 ml. of the methylene norbornene solution is added dropwise at a constant rate. The temperature is kept at 25° C. throughout the polymerization. The reaction is stopped and the copolymer is isolated as in Examples 1-4. This product is the control of Table III.

The reaction is repeated except that just before the catalyst and co-catalyst are injected into the resin flask, an 0.052 Molar 1,7-octadiene solution in tetrachloroethylene is added. Five ml. of the solution is used in Example 6A, and 10 ml. in Example 6B. The results are summarized in Table III.

TABLE III

| Example | Yield, grams | Wallace plasticity | $\eta_{inh.}$ | Moles/ kg. 1,7-octadiene | Percent propylene | Cold flow | Bromine unsatn. number [1] |
|---|---|---|---|---|---|---|---|
| 6A | 17.0 | 24.5 | 2.18 | .015 | 67 | 17 | 0.3 |
| 6B | 20 | 30 | 2.12 | .034 | 67 | 6 | 0.31 |
| Control | 17.0 | 17.5 | 1.84 | 0 | 69 | 60 | 0.26 |

[1] Gram-moles of H>C=CH— per kilogram of polymer.

EXAMPLES 7-9

Production of Ethylene/Propylene/1,4-Hexadiene/ Norborneo-Norbornene Copolymer Polymer samples are prepared according to the method described in Examples 2-5. Norborneo-norbornene is prepared according to the method of J. K. Stille, J. Am. Chem. Soc., 81, 4273 (1959). The norborneo-norbornene is passed through a short column of neutral grade Woelm alumina and diluted with perchloroethylene to prepare a solution approximately .025 Molar in diene. The desired quantity of diene solution is then added to the reaction flask at the time described in Table IV by means of a hypodermic syringe.

It can be seen from the results in Table IV that only a very small quantity of norborneo-norbonene is necessary to profoundly alter the bulk viscosity characteristics of the sulfur-vulcanizable terpolymer.

An E/P/norborneo-norbornene terpolymer is prepared by the method of Examples 2-9 except that no 1,4-hexa-

TABLE II

| Example | Reaction time, min. | Yield, grams | Wt. percent Propylene | Wt. percent 1,4-hexadiene | 4th monomer | Moles/ kg. 4th monomer | Wallace plasticity | $\eta_{inh.}$ | Cold flow | Vanadium catalyst |
|---|---|---|---|---|---|---|---|---|---|---|
| 2 Control | 20 | 20.5 | 49 | 3.6 | 1,4-pentadiene | 0 | 30 | 2.17 | 47 | |
| A | 20 | 23.5 | 51 | 3.2 | 1,4-pentadiene | 0.13 | 33 | 2.26 | 46 | V(AA)$_3$ |
| B | 20 | 21.0 | 49 | 3.5 | 1,4-pentadiene | 0.29 | 39 | 2.33 | 18 | |
| 3 Control | 15 | 15.5 | 48 | 3.5 | 1,20-heneicosadiene | 0 | 37 | 2.17 | 57 | |
| A | 15 | 16.0 | 51 | 3.7 | 1,20-heneicosadiene | 0.03 | 36 | 2.20 | 37 | V(AA)$_3$ |
| B | 15 | 14.0 | 48 | 3.9 | 1,20-heneicosadiene | 0.07 | 51 | 2.26 | 2 | |
| 4 Control | 15 | 12.0 | 46 | 3.8 | 1,7-octadiene | 0 | 30 | 2.67 | 55 | |
| A | 15 | 11.5 | 49 | 3.8 | 1,7-octadiene | 0.09 | 38 | 2.22 | 8 | VOCl$_3$ |
| B | 15 | 12.0 | 45 | 3.9 | 1,7-octadiene | 0.21 | 59 | 2.69 | 0 | |
| 5 Control | 15 | 13.5 | 45 | 4.2 | 5-(5-hexenyl)norbornene | 0 | 26 | 2.12 | 71 | |
| A | 15 | 14.5 | 50 | 4.2 | 5-(5-hexenyl)norbornene | 0.017 | 36 | 1.99 | 14 | V(AA)$_3$ |
| B | 15 | 16.5 | 53 | 3.7 | 5-(5-hexenyl)norbornene | 0.031 | 65 | 2.68 | 2 | |

TABLE IV.—PRODUCTION OF ETHYLENE/PROPYLENE/1,4-HEXADIENE/NORBORNEO-NORBORNENE (NBNB) COPOLYMER

| Example | Reaction Time, min. | Reaction Temp., °C. | Method of NBNB addn. | Quantity NBNB added, moles/kg. polymer | Cold flow | Wallace plasticity | $\eta_{inh}$ | Yield, grams | Percent propylene | Wt. percent 1,4-hexadiene |
|---|---|---|---|---|---|---|---|---|---|---|
| 7 control | 10 | 0 | | 0 | 65 | 32.7 | 2.33 | 10 | 44 | 3.6 |
| A | 10 | 0 | All initially | .029 | 2 | 70 | 2.63 | 8.5 | 44 | 4.1 |
| 8 control | 10 | 0 | | 0 | | 32.2 | 2.07 | 11.0 | 50 | 3.2 |
| A | 10 | 0 | All after 5' | .026 | | 55 | 2.18 | 9.5 | 43 | 3.9 |
| 9 control | 15 | 0 | | 0 | | 19.5 | 1.68 | 16 | 52 | 3.6 |
| A | 15 | 0 | All after 12' | .029 | | 25 | 1.70 | 17 | 53 | 3.7 |
| B | 15 | 0 | do | .059 | | 34 | 1.86 | 17 | 51 | 3.9 |
| C | 15 | 0 | do | 0.10 | | 39.5 | 1.86 | 15 | 48 | 3.6 | diene is used and the polymerization is conducted at 25° C. The product is designated Control Y. The reaction is repeated but with no norborneo-norbonene being added to the reaction flask in order to prepare an ethylene-propylene copolymer, designated Control Z. The results are shown in Table V.

TABLE V.—CONTROL POLYMERS CONTAINING NO DIOLEFIN HAVING ONLY ONE READILY POLYMERIZABLE DOUBLE BOND

| Control | Yield, g. | $\eta_{inh}$. | Percent propylene | Bromine equiv. | Moles/kg. norborneo-norbornene |
|---|---|---|---|---|---|
| Z | 18 | 1.64 | 70 | 0.04 | 0 |
| Y | 20 | 1.74 | 68 | 0.04 | 0.037 |

Neither control Y nor Z is curable by sulfur curing ingredients.

These results indicate that there is no contribution to the unsaturation number of the polymer by the norbonreo-norbornene, and that the incorporation of dienes with two readily polymerizable double bonds in the concentrations of the compositions of this invention does not confer sulfur curability on ethylene-propylene copolymers. Norborneo-norbornene is highly reactive and both double bonds react almost completely. In contrast, aliphatic dienes are not as reactive and they may leave a considerable residue of unsaturation in the polymer.

EXAMPLE 10

Production of E/P/1,4-Hexadiene/Bicyclo(2.2.1)-Hepta-2,5-Diene (2,5-Norbornadiene) Copolymer Ethylene/propylene/1,4-hexadiene polymers were prepared according to the method described in Examples 2–5 except that 7 ml. of 1 Molar diisobutylaluminum chloride was used as cocatalyst. The bicycloheptadiene was distilled and passed through a short column of alumina before use and used as 0.052 Molar solution in tetrachloroethylene. The amount designated in Table VI was added just before the catalyst and cocatalyst.

TABLE VI

| Moles bicyclo-heptadiene/kg. polymer | Wallace plas. | $\eta_{inh}$. | Yield (gms.) |
|---|---|---|---|
| 0 | 16 | 1.57 | 14.3 |
| .018 | 18 | 1.56 | 14.2 |
| .037 | 22 | 1.58 | 14.0 |
| .073 | 31 | 1.64 | 14.5 |
| .14 | 60 | 1.87 | 15.0 |

It can be seen that with increasing bicycloheptadiene content that the bulk viscosity went up rapidly whereas there was only a minimal increase in inherent viscosity.

EXAMPLE 11

Production of E/P/1,4-Hexadiene/Dimers of Bicyclo-Heptadiene Copolymers

Polymer samples were prepared as in Example No. 10. The bicyclo(2.2.1)-hepta-2,5-diene dimers were prepared by heating bicycloheptadiene with a bis(triphenyl phosphite) nickel dicarbonyl catalyst for 36 hrs. in toluene. The isomeric dimers so prepared have the structure designated thus:

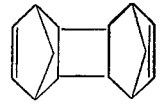

The results are reported in Table VII.

TABLE VII

| Moles/kg.—4th monomer | Wallace plas. | $\eta_{inh}$. |
|---|---|---|
| 0 | 18 | 1.61 |
| 0.017 | 51 | 2.16 |
| 0.037 | 78 | 2.53 |

EXAMPLE 12

Preparation of High Diene Content E/P/HD/OD Tetrapolymer

To a 2-liter resin kettle equipped with a mechanical stirrer, thermometer, addition funnel and syringe inlet, and dried thoroughly with a heat gun under a nitrogen atmosphere, is added 884 ml. of anhydrous hexane, 116 ml. of 1,4-hexadiene and 1.0 ml. of 1,7-octadiene. The stirred mixture is cooled to −17± 3° C. while being saturated with ethylene fed at a rate of three gram moles per hour and propylene fed at a rate of 0.1 gram mole per hour. A 2.33 ml. portion of pure diisobutylaluminum chloride is added followed by a dropwise addition of 20 ml. of a 0.1 M solution of $VCl_4$ in perchloroethylene over a period of 21 minutes. The temperature is maintained at −17±3° C. for 30 minutes after the addition of $VCl_4$ is begun. The polymerization is stopped with the addition of a hexane solution containing about 3.0 ml. of isopropanol and 0.5 grams of 4,4'-thio-bis-(6-tert-butyl-meta-cresol). The isolated polymer contains 8.4% of propylene by weight and 2.61 moles/kg. of ethylenic unsaturation.

EXAMPLE 13

A. Preparation of α,ω-Diallylpolybutadiene

A 2-liter flask was fitted with a magnetic stirrer, a thermometer, a condenser and two addition funnels (one of which had "cold fingers" suitable for cooling with crushed solid carbon dioxide). After the entire assembly had been dried with heat under a nitrogen atmosphere, one liter of anhydrous, reagent grade tetrahydrofuran, fifty grams of reagent grade naphthalene, and 2.1 grams of clean lithium ribbon were added in turn to the flask. The temperature was held at 25–30° C. until the lithium was completely dissolved (2.6 hours). Then the solution was cooled to −45° C. Butadiene (92 ml.), which had been dried by passage through a molecular sieve tower, was collected in the cold addition funnel and added to the flask during a 15-minute period. The resulting solution was allowed to warm to −10° C. in thirty minutes and held at −10±5° C. for one hour to prepare α,ω-dilithio polybutadiene. Then a total of thirty-nine milliliters of anhydrous allyl chloride was added dropwise while the temperature was kept at 0±5° C. The deep red color disappeared when twenty-three milliliters of allyl chloride had been added. Finally, a solution of 0.139 g. of 4,4'-dithiobis(3-methyl-6-tert-butylphenol) in a mixture of isopropanol/hexane (1:8 by volume) was introduced. After the solvents had been evaporated at reduced pressure, the resulting residue was steam distilled until all the naphthalene was removed. The viscous residue was separated from the water phase and finally dried at reduced pressure at 100° C. The α,ω-diallylpolybutadiene obtained thereby weighed 74.5 grams and had a number-average molecular weight of 480 (by vapor phase osmometry).

B. Preparation of E/P/1,4-Hexadiene/α,ω-Diallylpolybutadiene Tetrapolymer

The polymerization was carried out continuously by using a liquid-full, 1.2-liter, stainless steel reactor maintained at a pressure of 100 p.s.i.g. The following feed rates were established:

Ethylene, 2.365 gram-moles per hour; propylene 4.55 gram-moles per hour; 1,4-hexadiene, 0.207 gram moles per hour; α,ω-diallylpolybutadiene, 2.56 grams per hour; $VOCl_3$, .076 millimole per hour; triethylaluminum, 1.39 millimoles per hour; diethylaluminum chloride, 0.793 millimoles per hour; benzotrichloride, 1.95 moles per hour; hydrogen, 2.25 millimoles per hour; and hexane, 1.903 liters per hour.

The average residence time was thirty minutes. The reactor temperature was maintained at 35° C. by external cooling. Polymer was produced at an average rate of 100.6 grams per hour. The reactor effluent was discharged into a flasher where unreacted ethylene and propylene were allowed to evaporate at atmospheric pressure. The residual polymer solution was then mixed with a solution of 4,4'-thio-bis(3-methyl-6-tert-butyl phenol) in an isopropanol-hexane mixture (1:8 by volume) before catalyst residues were removed with dilute acetic acid and water washes. Hexane was removed by evaporation on a drum drier. The isolated tetrapolymer had the following monomer unit composition: 2.5% α,ω-diallylpolybutadiene, 38.8% propylene, 3.1% 1,4-hexadiene, and 55.6% ethylene (by weight). The inherent viscosity of the polymer was 1.86 (measured at 30° C. on a solution of 0.1 gram of tetrapolymer in 100 ml. of tetrachloroethylene); the Mooney viscosity (ML–1+4 at 121° C.) was 38.

The branched-chain elastomeric copolymers of this invention have been found to be especially useful in blends with polyunsaturated elastomers such as natural rubber and the synthetic diene elastomers. It is known in the art that the EPM and EPDM elastomers confer a measure of ozone resistance on such blends, but it has surprisingly been found that the branched-chain tetrapolymers of this invention are much more effective than the prior art terpolymers as illustrated by the following Experiments.

EXAMPLE A

The following compositions are prepared by standard laboratory rubber milling procedure and vulcanized in test slabs for 15 minutes at 163° C.

|  | A | B |
|---|---|---|
| Natural rubber (smoked sheet) | 80 | 80 |
| Ethylene/propylene/1,4-hexadiene terpolymer ("Nordel" 1070) | 20 |  |
| Ethylene/propylene/1,4-hexadiene/1,7-octadienetetrapolymer (.06 moles/kg.) |  | 20 |
| Hard clay | 20 | 20 |
| HAF carbon black | 15 | 15 |
| Processing oil ("Circo")[1] | 7 | 7 |
| Mercaptobenzothiazoline disulfide | 0.5 | 0.5 |
| Diphenylguanidine | 0.35 | 0.35 |
| Sulfur | 1.5 | 1.5 |
| Stearic acid | 1.5 | 1.5 |

[1] Naphthenic petroleum oil.

Specimens of the vulcanizates are tested for ozone resistance by ASTM method D1149, at 50 and 300 parts ozone per 100 million (p.p.h.m.). As shown by the data of the Table VIII, the octadiene-modified tetrapolymer gives a blend with natural rubber having substantially better ozone resistance than the prior art EPDM terpolymer.

TABLE VIII.—OZONE RESISTANCE OF 80:20 NATURAL RUBBER/COPOLYMER BLENDS

|  | Rating[1] | |
|---|---|---|
|  | Blend A | Blend B |
| 50 p.p.h.m. ozone: | | |
| Dynamic: | | |
| 1 hr | 9 | 10 |
| 3 hr | 6 | 8 |
| 5 hr | 4 | 6 |
| 11 hr | 2 | 4 |
| Bent loop: | | |
| 1 hr | 7 | 9 |
| 3 hr | 5 | 9 |
| 5 hr | 4 | 7 |
| 20% elongation: | | |
| 1 hr | 7 | 10 |
| 3 hr | 5 | 10 |
| 7 hr | 3 | 10 |
| 25 hr | 1 | 10 |
| 300 p.p.h.m. ozone: | | |
| Dynamic: | | |
| 1 hr | 4 | 9 |
| 3 hr | 1 | 5 |
| 5 hr | 1 | 4 |
| 7 hr | 0 | 2 |
| 10% elongation: | | |
| 1 hr | 9 | 9 |
| 5 hr | 7 | 9 |
| 15 hr | 2 | 9 |
| 20% elongation: | | |
| 1 hr | 4 | 10 |
| 2 hr | 3 | 10 |
| 5 hr | 2 | 10 |

[1] 10=no effect. 8=noticeable visual cracking. 4=heavy cracking. 0=break.

EXAMPLE B

A masterbatch was prepared in a Farrel "Midget Banbury Mixer" (having a 250 ml. void) by combining 20 grams of the tetrapolymer of Example 13B, 50 grams of natural rubber, 30 grams of neoprene, type W, 3.5 grams of zinc oxide, 25 grams of FEF carbon block, and 3.0 grams of Circosol Light Oil.[1] Then the following curing ingredients consisting of 0.5 gram of 2,2'-dithiobisbenzothiozole, 0.35 gram of diphenylguanidine, 2.0 grams of stearic acid and 1.3 gram of sulfur were added at about 50° C. on a 4 x 8" rubber mill. Slabs, made from the resulting stock, were cured for 15 minutes at 320° F. between "Mylar" polyester sheets. Dumbells were cut with a die and clamped in the "Dynamat" attachment in a chamber at 40° C. where the ozone concentration was maintained at 0.5 p.p.m. and the samples were flexed for a period of up to 24 hours.

The tetrapolymer of Example 13B imparted good ozone resistance to the blends, whereas a control blend substituting a tripolymer of ethylene, propylene and 1,4-hexadiene (made by a similar process) for the tetrapolymer displayed poor ozone resistance.

The branched-chain elastomeric copolymers of this invention have been found to be especially useful in blends with polyunsaturated elastomers, such as natural rubber, and the synthetic diene elastomers. Particularly useful are styrene/butadiene elastomers (e.g. SBR containing 23.5% styrene by weight), polybutadiene, and butadiene/acrylonitrile, (e.g. NBR having 20-45% acrylonitrile). Natural rubber, styrene/butadiene, and polybutadiene are preferred.

[1] Naphtenic petroleum oil.

What is claimed is:

1. A sulfur-curable ozone-resistant composition comprising about 10 to 30 parts by weight of a copolymer of (a) from 25% to 75% by weight of ethylene units, (b) units derived from a $C_5$–$C_{21}$ polyolefin containing two polymerizable double bonds, said polyolefin units being present in an amount resulting from the addition to the reaction mixture from which said copolymer is formed of about from 0.01 to 0.5 gram mole per kilogram of copolymer formed of said $C_5$–$C_{21}$ polyolefin, the amount of the polyolefin not to exceed 15% by weight of the copolymer, (c) sufficient units of a non-conjugated diolefin containing only one polymerizable double bond selected from the group consisting of (1) an aliphatic diolefin, and (2) a cycloaliphatic compound having a one- or two-carbon bridged ring structure to provide 0.1 to 4.0 gram moles per kilogram of carbon-carbon double bonds derived from the diolefin, and (d) the remainder of said copolymer being propylene units, and about 90 to 70 parts by weight of a polyunsaturated elastomer selected from natural rubber or a synthetic diene elastomer.

2. Composition of claim 1 wherein the polyunsaturated elastomer is natural rubber.

3. A composition of claim 1 wherein polyolefin (b) has two strained ring double bonds a cycloaliphatic structure.

4. A composition of claim 1 wherein polyolefin (b) has two unhindered terminal double bonds.

5. A composition of claim 1 wherein polyolefin (b) has one strained ring double bond in a cycloaliphatic structure and one unhindered terminal double bond.

6. A composition of claim 1 wherein the synthetic diene elastomer is styrene/butadiene.

7. A composition of claim 3 wherein diolefin (c) is an aliphatic olefin.

8. A composition of claim 3 wherein diolefin (c) is a cycloaliphatic olefin having a one- or two-carbon bridge ring structure.

9. A composition of claim 1 wherein polyolefin (b) is norbornadiene.

10. A composition of claim 9 wherein diolefin (c) is 1,4-hexadiene.

11. A composition of claim 9 wherein diolefin (c) is 5-ethylidene-2-norbornene or dicyclopentadiene.

12. A composition of claim 9 wherein the polyunsaturated elastomer is natural rubber.

References Cited

UNITED STATES PATENTS

| | | | |
|---|---|---|---|
| 3,554,988 | 1/1971 | Emde et al. | 260—80.78 |
| 3,444,146 | 5/1969 | Valvassori et al. | 260—80.78 |
| 3,224,985 | 12/1965 | Gladding et al. | 260—5 |
| 3,443,619 | 5/1969 | Kindle | 260—5 |
| 3,492,370 | 1/1970 | Wirth | 206—5 |

JOHN C. BLEUTGE, Primary Examiner

U.S. Cl. X.R.

260—23.7 M, 41.5 R, 80.78, 889